March 28, 1961 R. H. MORRISON 2,976,979
HANDLING OF BISCUITS AND THE LIKE
Filed March 21, 1960 3 Sheets-Sheet 1
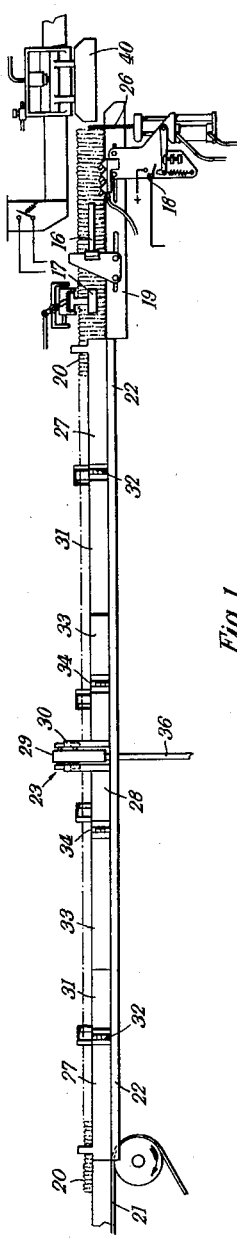
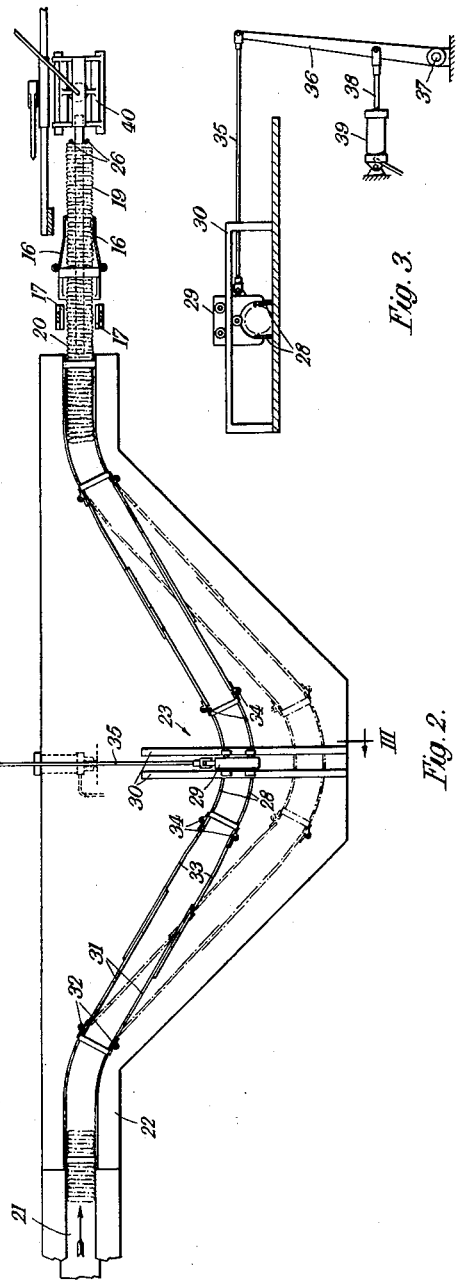
INVENTOR
Robert Henry Morrison
By Watson, Cole, Grindle & Watson
ATTORNEYS

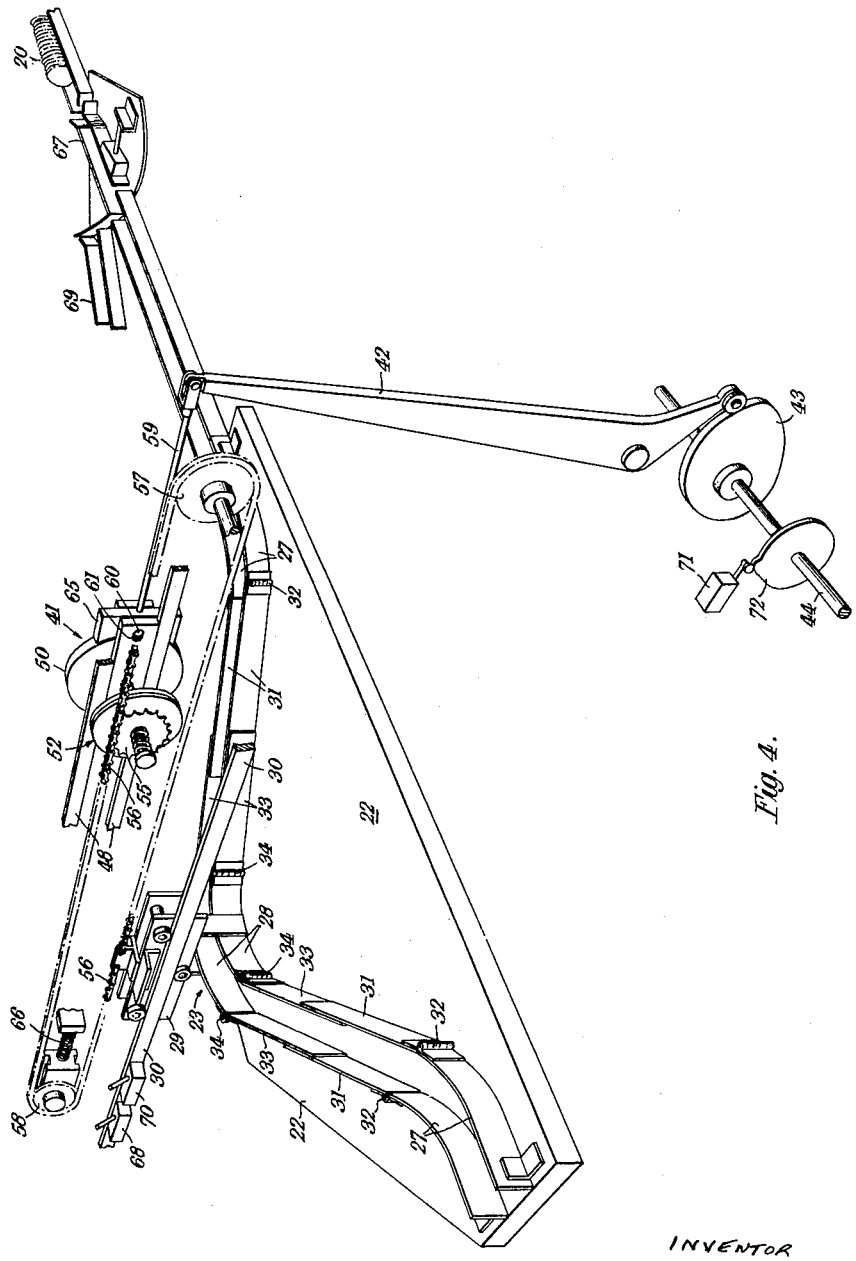

United States Patent Office 2,976,979
Patented Mar. 28, 1961

2,976,979

HANDLING OF BISCUITS AND THE LIKE

Robert Henry Morrison, Woodley, Reading, England, assignor to Packman Machinery Limited, Twyford, Berkshire, England, a company of Great Britain Filed Mar. 21, 1960, Ser. No. 16,222

8 Claims. (Cl. 198—45)

This invention is concerned with apparatus for feeding a column of biscuits standing on edge to a transfer station, at which a transfer mechanism operates intermittently at regularly timed intervals to remove batches of articles from the head of the column for the purpose of further handling e.g. tray filling or packaging.

The biscuits lying flat on the cooling conveyor of a biscuit making plant may, for example, be converted into an edge-on column by the apparatus described in British specification No. 801,564. The biscuits constituting the column are fed continuously by pressure from behind along a horizontal or substantially horizontal dead plate or other supporting surface (e.g. supporting rails or a moving conveyor belt) to a stop situated at the transfer station. The rate of supply of biscuits to the transfer station must obviously not exceed the rate of removal of the biscuits from the head of the column by the transfer mechanism and it is impracticable, owing to the inevitable variations in thickness of the biscuits, to match exactly the rates of supply and removal. It is accordingly necessary to supply the biscuits at an average rate which is slightly less than the constant rate of removal and nevertheless to ensure that the transfer mechanism removes a complete batch of biscuits at each cycle, executing an idle stroke occasionally when insufficient biscuits are available. The invention provides a solution to the problem of matching the continuous and slightly slower feed of the column of biscuits to the supporting surface to the intermittent removal of batches of biscuits from the head of the column by the transfer mechanism.

The invention provides apparatus for feeding a column of biscuits standing on edge to a transfer station, comprising a horizontal or nearly horizontal supporting surface for the column along which the biscuits are fed forward by pressure from behind, an input conveyor for feeding the biscuits continuously on to the supporting surface, mechanism at the transfer station for arresting the head of the column and periodically transferring batches of biscuits from the head of the column, the transfer mechanism removing the biscuits at a rate slightly greater than the rate of supply of biscuits to the supporting surface, a flexible biscuit reservoir which serves to confine a portion of the column of biscuits on the supporting surface and is free to expand laterally to accommodate additional biscuits at the times when the head of the column is arrested, and power means for applying yielding pressure to the reservoir during the intervening periods to contract it and thereby to feed the biscuits positively forward towards the transfer station at predetermined times.

The flexible biscuit reservoir thus acts as a pump being alternately expanded, to admit biscuits pushed forward along the supporting surface by pressure from the following biscuits supplied by the input conveyor, and contracted to pump biscuits to the transfer station. The means utilised to contract the reservoir applies yielding pressure to the reservoir in order to avoid damage to the biscuits in the event of the head of the column being arrested before the reservoir is fully contracted. Thus the receiver may be contracted by admitting compressed air to a cylinder and piston one element of which is fixed and the other connected to the reservoir. Alternatively, the power means utilized to contract the reservoir may include a frictional override device arranged to yield under a predetermined load.

The reservoir may be constituted by pairs of side guides on a dead plate which serve to guide the opposite sides of the column of biscuits, each side guide including a pair of spaced fixed sections with a movable section between them. As viewed in plan, the fixed sections are preferably in line but the movable section turns tangentially away from the first, or entry, fixed section, then its curvature reverses, to bring it back towards the second or delivery fixed section and here the curvature reverses again so that the curve merges tangentially into the delivery section. The ends of the movable section are slidable in relation to curved ends of the fixed sections so that the reservoir is free to bulge in a direction transversely of the direction of flow of the biscuit column under the pressure of the advancing biscuits whenever the head of the column is arrested, and the power means operates in timed relationship with the transfer mechanism to apply yielding pressure to the movable sections of the side guides at a location at or near the centre of the bulge to straighten the bulge and so feed the biscuits positively forward to the transfer station.

Two specific embodiments of the invention will now be described in more detail, by way of example, with reference to the accompanying drawings, in which—

Fig. 1 is a side elevation showing a first form of biscuit pump,

Fig. 2 is a corresponding plan view,

Fig. 3 is a section on the line III—III in Fig. 2,

Fig. 4 is a diagrammatic perspective view of a second form of biscuit pump,

Like reference numerals indicate like parts throughout the figures.

Figure 5:
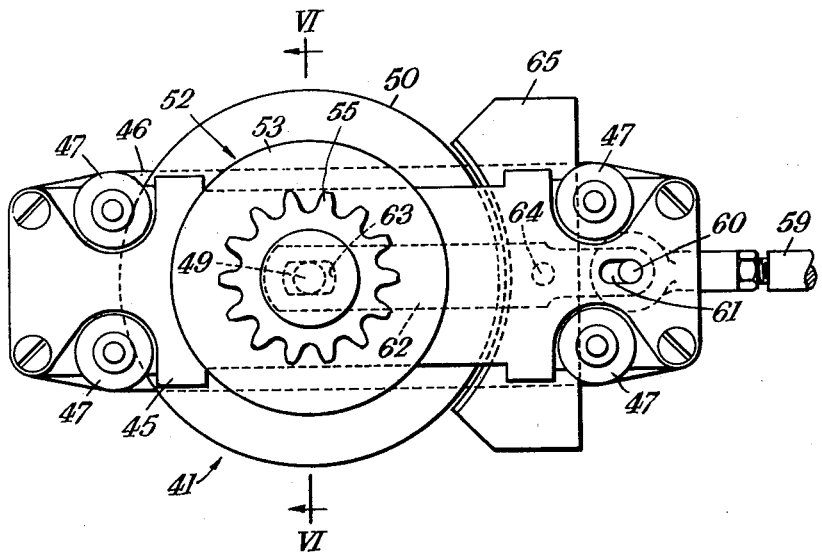
Fig. 5 is a side elevation of the crosshead of the biscuit pump shown in Fig. 4.

Figs. 1–3 show the biscuit pump arranged to supply biscuits to a transfer station at which batches of biscuits are removed from the head of the column by the mechanism described in United States application, Serial No. 818,150, filed June 4, 1959. As will be seen a column of biscuits 20, produced for example by the apparatus described in British specification No. 801,564, is fed by a continuously moving infeed conveyor 21 on to a dead plate 22, on which is mounted a biscuit pump 23. The biscuit pump serves, as later described, to feed the biscuits along a fixed track 19 and up to a stop 26 at the transfer station. Batches of biscuits are periodically removed from the head of the column by grippers 40. When the head of the column of biscuits contacts the stop 26 at the proper time in relation to the cycle of operations of the wrapping machine to which the biscuits are supplied by the grippers 40, the stop 26 is displaced to close a switch 18 and the grippers 40 are then able to close on the biscuits at the head of the column and remove a batch of biscuits from the column. The stop 26 is retracted to permit of removal of a batch of biscuits by the grippers 40 and is afterwards returned to its operative position. The grippers 40 remove biscuits from the column at a slightly greater rate than that at which they are fed forward by the biscuit pump. Accordingly, from time to time the head of the column of biscuits will not contact the stop 26 and close the switch 18 until a time so late in the cycle that the grippers 40 are prevented from closing, as fully described in United States application Serial No. 818,150, filed June 4, 1959 and therefore perform an idle stroke. Another pair of grippers 17 operates in timed relationship with the grippers 40 to retract the biscuits to the rear of those undergoing removal by the grippers 40 and a pair of spring metering fingers 16 acts to shield the biscuits immediately behind the batch to be removed and prevents them from being picked up by the grippers 40.

The biscuit pump 23 is constituted by opposite pairs of side guides, each of which includes a pair of fixed end sections 27, a curved centre section 28 mounted on a carriage 29 movable transversely to the track on guides 30, intermediate sections 31 pivoted at 32 to the end sections 27, and intermediate sections 33 pivoted at 34 to the centre section 28. As shown the sections 33 engage telescopically with the sections 31. The carriage 29 is coupled by a rod 35 to the upper end of a lever 36 mounted at its lower end on a fixed pivot 37 and connected intermediately of its length to a rod 38 coupled to a piston contained in a pneumatic cylinder 39. When air is exhausted from the cylinder 39, the biscuits fed on to the dead plate 22 by the conveyor 21 cause the guides to bulge from the configuration shown in full lines in Fig. 2 to that shown in chain-dotted lines. Periodically, however, air under pressure is admitted to the cylinder 39, as described in United States application No. 818,150, causing the lever 36 to move clockwise as seen in Fig. 3 and cause the guides to contract to pump biscuits on to the track 19 leading to the stop 26. It will be understood that compressed air is admitted to and relieved from the cylinder 39 in timed relationship with the operation of the grippers 40. Air is admitted to the cylinder 39 during the movement of the grippers 40 from their discharge position back to the transfer position and is cut off from the cylinder 39 shortly after the head of the column of biscuits has again reached the stop 26.

It will be appreciated that the pump, which includes a reservoir having an inflatable bulge, links a continuous flow of biscuits from the input conveyor 21 to an intermittent delivery of biscuits at the transfer station without breaking the continuity of the column of biscuits. Since the input of biscuits to the pump is slightly less than the rate of removal of biscuits at the transfer station, the bulge will inflate less at successive cycles until a point will be reached when the pump cannot deliver a full batch length of biscuits to the transfer station. At the next cycle, therefore, only a small displacement of the reservoir is required to complete the batch.

Figure 6:
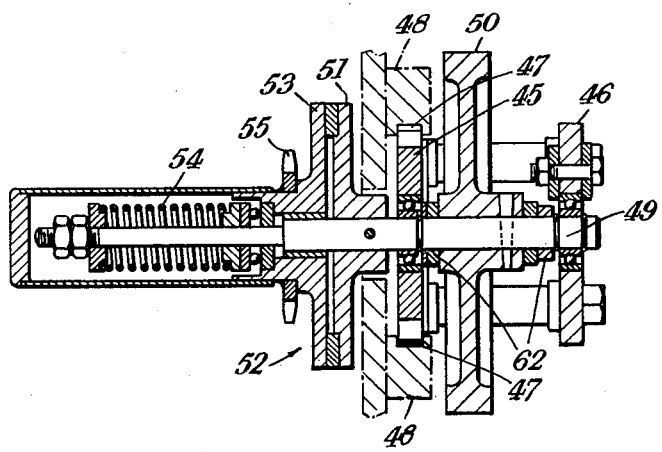
Fig. 6 is a section on the line VI—VI in Fig. 5.

The mechanism shown in Figs. 4-6 for operating the carriage 29 has been designed to completely compensate for these variable movements and at the same time reduce the stroke of the mechanical motions to reasonable limits, and for simplicity the pumping stroke is constant and operates every cycle.

The pumping action of the biscuit pump is derived from a crosshead 41 which receives a constant stroke at each machine cycle from a cam lever 42 actuated by a cam 43 on a cam shaft 44 driven in synchronism with the wrapping machine. The crosshead 41 allows the guides 28, 33 to inflate freely to any position due to the pressure of the infeed, yet mechanically deflates the guides by an amount varying with either the initial position of the guides prior to deflation, or the requirements at the transfer station, or both. A frictional override device permits, as later described, variable displacements to be obtained from the pump. In view of this override device all the possible variations of stroke of the pump can be provided while nevertheless retaining a potential displacement from the pump equal to the batch length.

As shown most clearly in Figs. 5 and 6, the crosshead 41 includes two side plates 45, 46, the former of which carries rollers 47 which run on a fixed guide 48. Rotatably mounted in the crosshead is a shaft 49 to which are fixed a brake drum 50 and one plate 51 of a friction clutch 52. The other plate 53 of the clutch is loose on the shaft 49 and is normally held in engagement with the plate 51 by a spring 54. A sprocket 55 fixed to the friction plate 53 engages a chain 56 (Fig. 4) extending around sprockets 57, 58 and attached to the carriage 29. A spring 66 ensures that the chain 56 will remain tight.

A link 59 connected to the cam lever 42 carries a pin 60 which is movable in slots 61 in the side plates of the crosshead 41. The pin 60 is connected to a pair of links 62, formed with slots 63 which embrace the shaft 49. The links 62 are connected by a pin 64 to a brake shoe 65.

In the position shown in Fig. 4, the cam lever 42 is being rocked clockwise by the cam 43, with the result that the link 59 has withdrawn the shoe 65 from the brake drum 50 and is moving the crosshead 41 to the right. The biscuit column is accordingly able to inflate the bulge formed by the movable guides 28, 33, moving the carriage 29 to the left and causing corresponding movement of the chain 56, which is permitted because the sprocket 55 can rotate freely due to the brake being disengaged.

As the next cycle commences the cam lever 42 thrusts the brake shoe 65 on to the drum 50, so immediately preventing the sprocket 55 from rotating. Continued movement of the link 59 will now move the crosshead 41 to the left, and the engagement of a tooth of the sprocket 55 with the chain 56 will haul the chain with it, so moving the carriage 29 to the right and deflating the reservoir, irrespective of the position of the carriage 29 at the start of the cycle.

The plate clutch 52 is designed to slip at a predetermined load, e.g. 10 lbs. If the pump does not require to feed a complete batch of biscuits to the transfer station, the clutch 52 will slip as soon as the resistance building up in the column of biscuits exceeds 10 lbs. The crosshead 41, however, will complete its cam controlled stroke to the left, the sprocket 55 now rotating on the stationary chain 56 and imparting no further movement to the carriage 29.

The compression pressure which will be built up in the column of biscuits on the output side of the pump before the clutch slips will not damage even fragile biscuits. The diameter of the brake drum 50 is such that it will not slip at any load below the slipping load of the plate clutch 52. The brake assembly is in effect an infinite ratchet. It will be noted that the crosshead 41 and the carriage 29 haul the chain round the same sprocket 58. This makes it very convenient to use the spring loaded tensioner 66 without losing sensitivity in the movement.

As soon as the operating lever 42 commences its return stroke the brake is immediately released, and whilst the crosshead 41 is returning the infeed of biscuits can continue to inflate the reservoir and so make maximum use of the time available.

If the wrapping machine should be stopped while the plant is still running it is necessary to divert the biscuits from the pump. Accordingly an overload microswitch 68 is provided which is actuated on excessive outward displacement of the guides 28, 33 and then operates a switching gate 67 to divert the oncoming biscuits into a discharge track 69. This device also caters for a sudden rise in the rate of production of biscuits which is not immediately matched by an increase in speed of the wrapping machine.

The pump may also include a pair of additional switches 70, 71 which are wired in series in a circuit controlling the operation of a stop (not shown) in the output line of the pump. The switch 70 is closed by the reservoir when the latter expands to the extent corresponding to the addition to its content of a full batch length of biscuits. The switch 71 is a synchronising switch and it is closed by a cam 72 on the cam shaft 44 at a definite time in the cycle of operation of the wrapping machine, such as will synchronise the delivery of the batch of biscuits with the operation of the transfer mechanism. The stop is operative to prevent delivery of biscuits from the pump to the transfer station unless both switches 70 and 71 are closed.

The switch 70 is not closed until the reservoir has collected a batch length of biscuits, but if this takes place after the momentary closing of the switch 71 by the cam 72 the stop is maintained in position throughout the cycle, the clutch 52 slipping throughout the pumping stroke of the crosshead 41. In the next cycle, however, the switch 71 will close to remove the stop and enable the pump to discharge a complete batch of biscuits to the transfer station.

What I claim as my invention and desire to secure by Letters Patent is:

1. Apparatus for feeding a column of biscuits standing on edge to a transfer station, comprising a horizontal or nearly horizontal supporting surface for the column along which the biscuits are fed forward by pressure from behind, an input conveyor for feeding the biscuits continuously on to the supporting surface, mechanism at the transfer station for arresting the head of the column and periodically transferring batches of biscuits from the head of the column, the transfer mechanism removing the biscuits at a rate slightly greater than the rate of supply of biscuits to the supporting surface, a flexible biscuit reservoir which serves to confine a portion of the column of biscuits on the supporting surface and is free to expand laterally to accommodate additional biscuits at the times when the head of the column is arrested, and power means for applying yielding pressure to the reservoir during the intervening periods to contract it and thereby to feed the biscuits positively forward towards the transfer station at predetermined times.

2. Apparatus according to claim 1, in which the power means is constituted by a pneumatic cylinder and piston, one element of which is fixed and the other connected to the reservoir.

3. Apparatus according to claim 1, in which the power means includes a frictional override device arranged to yield under a predetermined load.

4. Apparatus according to claim 1, in which the reservoir is constituted by pairs of side guides on a dead plate, each side guide including a pair of spaced fixed sections with a movable section between them.

5. Apparatus according to claim 4, in which the fixed sections of each side guide are in line and the movable section is curved, as viewed in plan, its ends being free to slide in relation to curved ends of the fixed sections, and in which the power means is connected to the movable sections at or near their mid-points.

6. Apparatus according to claim 3, in which the power means includes a crosshead which receives a reciprocating movement of constant amplitude at each cycle of operation, a sprocket rotatably mounted in the crosshead and engaging a loop of chain fixed to the reservoir, a brake operatively connected to the sprocket, means for applying the brake when the crosshead is moving in the direction to contract the reservoir and for disengaging the brake when the crosshead is moving in the opposite direction and a friction clutch between the sprocket and the brake which is arranged to slip under a predetermined load.

7. Apparatus according to claim 1, which includes an overload switch arranged to be actuated by the reservoir when it expands to a predetermined extent and a switching gate arranged to operate in response to actuation of the overload switch to divert the biscuits from the pump.

8. Apparatus according to claim 1, which includes a switch arranged to be actuated by the reservoir when it has expanded to an extent corresponding to the addition to its content of a full batch length of biscuits, a synchronising switch arranged to be actuated momentarily at a predetermined time in the cycle of operation, and a stop in the output line of the pump for preventing delivery of biscuits from the pump to the transfer station unless both switches are actuated simultaneously.

References Cited in the file of this patent

UNITED STATES PATENTS 1,926,060     Peters _____ Sept. 12, 1933